United States Patent
Inoue et al.

(10) Patent No.: US 8,390,689 B2
(45) Date of Patent: Mar. 5, 2013

(54) OPTICAL APPARATUS THAT PREVENTS DISPLACEMENT OF SUBJECT IMAGES DUE TO AN INITIALIZING OPERATION

(75) Inventors: Katsuhiro Inoue, Utsunomiya (JP); Masanori Ishikawa, Saitama (JP); Jun Sugita, Sagamihara (JP); Hiroshi Akada, Yokohama (JP); Sawako Ito, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 90 days.

(21) Appl. No.: 13/155,747

(22) Filed: Jun. 8, 2011

(65) Prior Publication Data
US 2011/0234827 A1  Sep. 29, 2011

Related U.S. Application Data

(62) Division of application No. 11/608,308, filed on Dec. 8, 2006, now abandoned.

(30) Foreign Application Priority Data

Dec. 9, 2005 (JP) ................................ 2005-356592

(51) Int. Cl.
*H04N 5/228* (2006.01)
*G03B 17/00* (2006.01)
*G02B 27/64* (2006.01)

(52) U.S. Cl. ....................... 348/208.11; 396/55; 359/554

(58) Field of Classification Search .................. 348/360, 348/362, 208.11, 357; 396/529
See application file for complete search history.

(56) References Cited

U.S. PATENT DOCUMENTS

| 5,751,351 | A | 5/1998 | Mogi |
| 6,631,042 | B2 | 10/2003 | Noguchi |
| 6,683,652 | B1 | 1/2004 | Ohkawara et al. |
| 6,721,012 | B2 | 4/2004 | Kawamura et al. |
| 6,985,126 | B2 * | 1/2006 | Hoppenbrouwers et al. ... 345/60 |
| 7,548,257 | B2 * | 6/2009 | Ito et al. ..................... 348/208.7 |
| 8,228,388 | B2 * | 7/2012 | Noguchi ................ 348/208.11 |
| 2002/0112543 | A1 | 8/2002 | Noguchi |
| 2011/0013029 | A1 * | 1/2011 | Akutsu et al. ............ 348/208.11 |

FOREIGN PATENT DOCUMENTS

| JP | 02-149075 A | 6/1990 |
| JP | 09-080536 A | 3/1997 |
| JP | 10-319465 A | 12/1998 |
| JP | 2001-290184 A | 10/2001 |
| JP | 2002-196382 A | 7/2002 |

* cited by examiner

*Primary Examiner* — John Villecco
(74) *Attorney, Agent, or Firm* — Rossi, Kimms & McDowell LLP

(57) ABSTRACT

An optical apparatus is disclosed which can prevent displacement of subject images due to an initializing operation of the image stabilizing unit from being seen by a photographer through a finder. The apparatus comprises an image-stabilizing unit which includes a movable unit movable for image stabilization and balls movable in conjunction with the movement of the movable unit, and a controller which controls operations of the movable unit. The controller causes the movable unit to perform a specific operation for moving the balls to a specific position in response to mounting of the optical apparatus on another optical apparatus, the specific operation being a different operation from an image stabilization operation of the image-stabilizing unit.

2 Claims, 14 Drawing Sheets

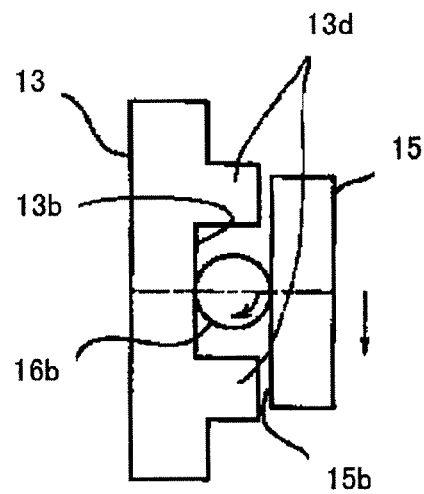
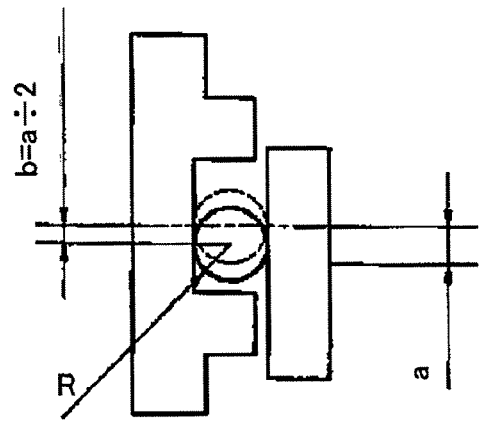
FIG. 5A
FIG. 5B
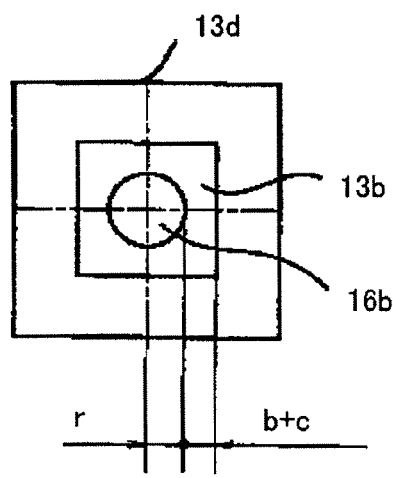
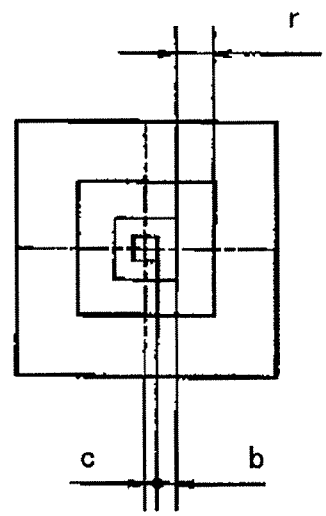
FIG. 5C
FIG. 5D

OPTICAL APPARATUS THAT PREVENTS DISPLACEMENT OF SUBJECT IMAGES DUE TO AN INITIALIZING OPERATION

CROSS REFERENCE TO RELATED APPLICATION

This is a divisional of and claims priority from U.S. patent application Ser. No. 11/608,308 filed Dec. 8, 2006 the content of which is incorporated herein by reference.

BACKGROUND OF THE INVENTION

1. Field of the Invention

The present invention relates to an optical apparatus including a so-called ball-guide image-stabilizing unit.

2. Description of the Related Art

The ball-guide image-stabilizing unit to be installed in an interchangeable lens or a video camera has been disclosed in Japanese Patent Laid-Open No. H10-319465, for instance. To be more precise, multiple balls are sandwiched between a base member of the image-stabilizing unit and a movable unit including an image stabilization lens by using a spring force so as to guide the movable unit in a plane orthogonal to the optical axis by rolling motions of the balls. It is possible, by this configuration, to realize the image-stabilizing unit of which drive resistance is reduced while blocking displacement of the movable unit in the optical axis direction.

As for the ball-guide image-stabilizing unit, however, it is desirable that the balls be placed at initial positions which are at the center of a range of movement thereof or in the vicinity thereof before starting an image stabilization operation. The image-stabilizing unit of Japanese Patent Laid-Open No. H10-319465 has the balls housed in a concave portion for limiting the range of movement formed on the base member. And in a state where the balls have moved greatly from the initial positions and are in contact with a sidewall surface of the concave portion, the balls hardly roll due to friction with the sidewall surface. Thus, drive resistance of the movable unit increases. In many cases, such a deviation of the balls from the initial positions occurs when an impact is brought on a lens apparatus.

For this reason, Japanese Patent Laid-Open No. 2001-290184 and Japanese Patent Laid-Open No. 2002-196382 have disclosed a technique of, before causing the ball-guide image-stabilizing unit to perform an image stabilization operation, causing it to perform an initializing operation of driving the movable unit to mechanical ends in two mutually orthogonal directions, that is, vertical and horizontal directions, and then returning it to a movable center position. It is thereby possible to reset the balls at the initial positions of the range of movement whatever positions in the range of movement the balls are initially at.

Japanese Patent Laid-Open No. 2002-196382 has proposed that the initializing operation of ball positions should be performed subsequently to or simultaneously with a reset operation of zooming or focusing at the time of power-on. It also proposes the initializing operation should be performed in a state other than during use of an image-pickup apparatus (during monitor observation of a picked up image or recording thereof).

In the case where a photographer observes a subject through a finder in real time as with a single-lens reflex camera system, displacement of a subject image due to the initializing operation is observed if the initializing operation of the ball positions is performed during observation of the finder. Therefore, there is a possibility of giving the photographer a sense of discomfort.

Even if the initializing operation is performed in a state other than using an image-pickup apparatus, there is a possibility that the ball positions deviate from the initial positions due to an impact during the use or the like after the power-on of the image-pickup apparatus.

BRIEF SUMMARY OF THE INVENTION

The present invention provides an optical apparatus which can prevent displacement of subject images due to the initializing operation of the image stabilizing unit (ball positions) from being seen by a photographer through the finder.

The present invention in its first aspect provides an optical apparatus which comprises an image-stabilizing unit including a movable unit movable for image stabilization and balls movable in conjunction with the movement of the movable unit, and a controller which controls operations of the movable unit. The controller causes the movable unit to perform a specific operation for moving the balls to a specific position in response to mounting of the optical apparatus on another optical apparatus, the specific operation being a different operation from an image stabilization operation of the image-stabilizing unit.

The present invention in its second aspect provides an optical apparatus which comprises an image-stabilizing unit including a movable unit movable for image stabilization and balls movable in conjunction with the movement of the movable unit, and a controller which controls operations of the movable unit. The controller causes the movable unit to perform a specific operation for moving the balls to a specific position in a state where a power switch of the optical apparatus or another optical apparatus on which the optical apparatus is mounted is off, the specific operation being a different operation from an image stabilization operation of the image-stabilizing unit.

The present invention in its third aspect provides an optical apparatus which comprises an image-stabilizing unit including a movable unit movable for image stabilization and balls movable in conjunction with the movement of the movable unit, and a controller which controls operations of the movable unit. The controller causes the movable unit to perform a specific operation for moving the balls to a specific position in response to replacement of a power supply on the optical apparatus or another optical apparatus on which the optical apparatus is mounted, the specific operation being a different operation from an image stabilization operation of the image-stabilizing unit.

The present invention in another aspect provides an image-pickup system which comprises the above-mentioned optical apparatus, and an image-pickup apparatus on which the optical apparatus is mounted and which includes a finder for observing a subject image formed by the optical apparatus.

Other objects and features of the present invention will become readily apparent from the following description of the preferred embodiments with reference to accompanying drawings.

BRIEF DESCRIPTION OF THE DRAWINGS

FIGS. 5A to 5D are diagrams describing a guide portion by means of balls of the image-stabilizing unit of the first embodiment;

DETAILED DESCRIPTION OF THE PREFERRED EMBODIMENTS

Hereinafter, preferred embodiments of the present invention will be described with reference to the accompanying drawings.

[First Embodimen]

Figure 1:
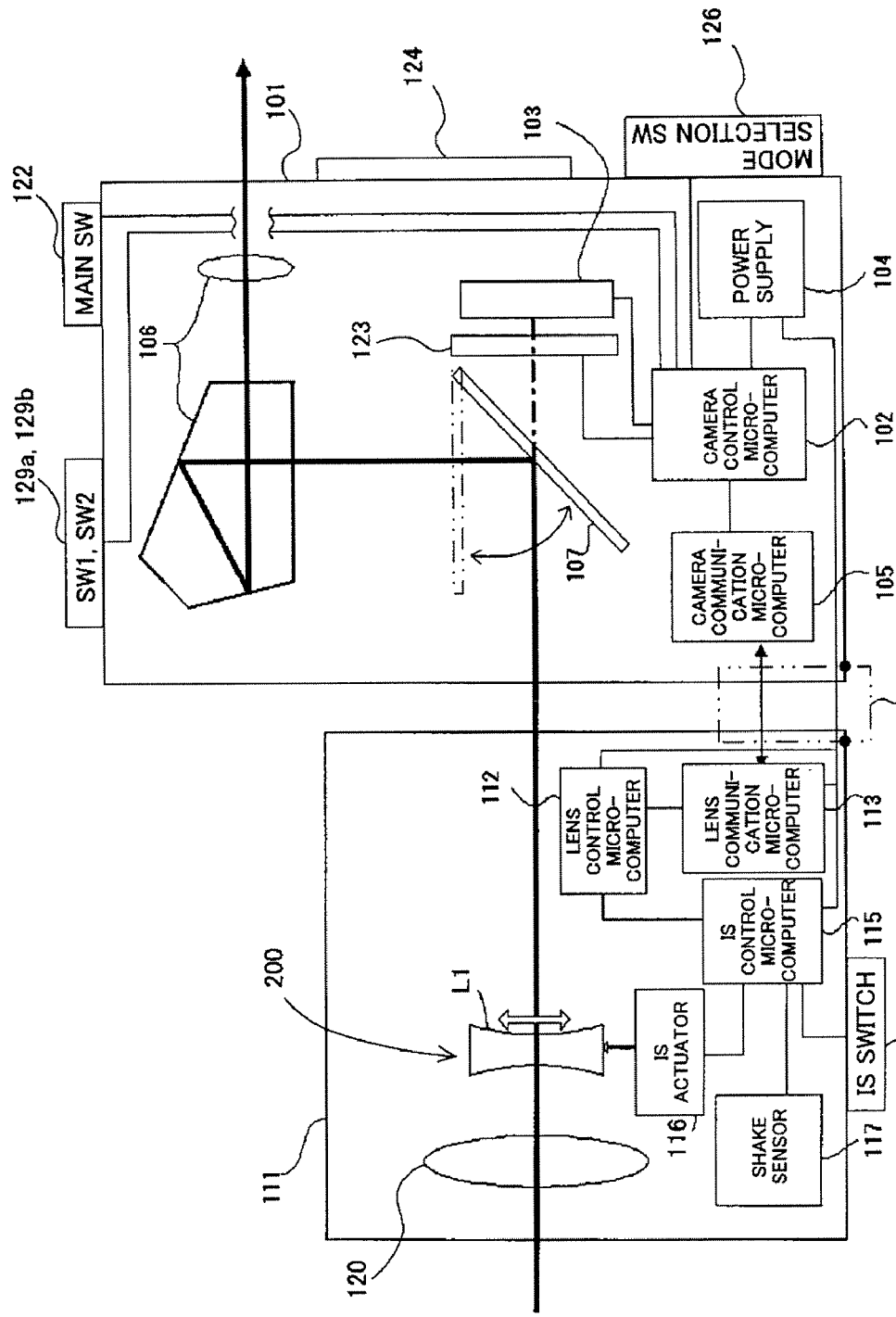
FIG. 1 is a block diagram showing a configuration of a single-lens reflex image-pickup system, which is the first embodiment of the present invention.

FIG. 1 shows the configuration of a single-lens reflex image-pickup system, which is the first embodiment of the present invention. Reference numeral 101 denotes a camera body (hereinafter, simply referred to as a camera) as an image-pickup apparatus which is another optical apparatus constituting the image-pickup system. Reference numeral 111 denotes an interchangeable lens (hereinafter, simply referred to as a lens hereafter) as a lens apparatus which is an optical apparatus constituting the image-pickup system, and it is detachably mounted on the camera 101.

First, the configuration on the camera 101 will be described. A finder optical system 106 is provided in the camera 101. There is also a quick return mirror 107 provided therein, which is an optical element movable to a down position (first position) for guiding a luminous flux from the lens 111 to the finder optical system 106 and an up position (second position) for moving out of an optical path from the lens 111.

The camera 101 is also provided therein with a photometric part, not shown, for measuring the amount of light from the lens 111 and an image-pickup element 103 such as a CCD sensor or a CMOS sensor for photoelectrically converting a subject image formed by the lens 111. Reference numeral 123 denotes a shutter for controlling exposure of the image-pickup element 103, and 124 denotes a display device provided on a backside of the camera 101.

An image-pickup signal outputted from the image-pickup element 103 is inputted to an image processing circuit not shown, where an image signal is generated based on the image-pickup signal. When a first stroke switch (SW1) 129a is turned on by half pressing a release switch, not shown, the camera 101 enters an image-pickup preparatory state in which photometry, AF and the like are performed. When a second stroke switch (SW2) 129b is turned on by fully pressing the release switch, the shutter 123 performs an opening and closing action and the image signal is generated based on the output from the image-pickup element 103. The image signal is recorded on a recording medium (a semiconductor memory, an optical disk or the like), not shown, and displayed on the display device 124.

Furthermore, the camera 101 is provided therein with a focus detection circuit (not shown) for detecting a focus state of an image-pickup optical system in the lens 111 based on an output signal from the image-pickup element 103. Reference numeral 126 denotes an image-pickup mode selection switch. The image-pickup mode selection switch 126 is operated to select a single image-pickup mode and a continuous image-pickup mode.

Various operations of the camera 101 are controlled by a camera control microcomputer 102. The camera 101 is provided with a camera communication microcomputer 105 for performing a serial communication with the lens 111.

The camera 101 and the lens 111 are also electrically connected via electric contacts 150. The camera communication microcomputer 105 performs communication with the lens 111 via a communication contact of the electric contacts 150. The camera 101 is provided therein with a power supply 104. Electric power from the power supply 104 is supplied to each of the portions in the camera 101, and is also supplied to the lens 111 via a power supply contact of the electric contacts 150.

Next, the configuration of the lens 111 will be described. Reference numeral 120 denotes a lens unit including a magnification varying lens, a focus lens, a stop unit and the like. Reference character L1 denotes a correction lens as an image stabilization optical element. The lens unit 120 and correction lens L1 constitute an image-pickup optical system.

The correction lens L1 moves in the directions (pitch direction and yaw direction) orthogonal to the optical axis of the image-pickup optical system (lens unit 120) and thereby performs image-shake correction (image stabilization) of the subject image formed on the image-pickup element 103 by the image-pickup optical system in the pitch direction and yaw direction. The directions orthogonal to the optical axis referred to here include not only the direction completely orthogonal to the optical axis but also the directions which can be optically regarded as orthogonal to the optical axis. The pitch direction corresponds to the vertical direction, and the yaw direction corresponds to the horizontal direction.

Reference numeral 112 denotes a lens control microcomputer which performs drive control of the magnification varying lens, focus lens and stop unit. The lens control microcomputer 112 performs a serial communication with the camera 101 via a lens communication microcomputer 113.

Reference numeral 115 denotes an image stabilization (IS) control microcomputer for controlling the operation of an image stabilization actuator 116 which drives the correction lens L1. The image stabilization actuator 116 is composed of a coil, a magnet and a yoke as will be described later. An image-stabilizing unit 200 is composed of a movable unit including the image stabilization actuator 116 and the correction lens L1, a base member which holds the movable unit movable in the pitch direction and yaw direction and the balls which guides movement of the movable unit. A concrete configuration of the image-stabilizing unit 200 will be described later. A controller is configured by the lens control microcomputer 112 and the image stabilization control microcomputer 115.

Furthermore, the lens 111 is provided therein with a shake sensor 117 for detecting shake, such as hand shake, of the lens 111 and the entire image-pickup system. The shake sensor 117 is composed of an angular velocity sensor, an acceleration sensor or the like, and outputs an electrical signal according to the shakes in the pitch direction and yaw direction.

Reference numeral 125 denotes an image stabilization (IS) switch for selecting whether or not the image stabilization operation is performed.

Though not shown, the lens 111 is further provided with a stop actuator, a stop driver, a focus actuator, a focus driver, a focus position detector, a zoom operating ring and a zoom position detector.

Next, the operation of each of the components will be described. The stop driver drives the stop actuator according to a command from the lens control microcomputer 112 and activates the stop unit. The focus driver drives the focus actuator according to a command from the lens control microcomputer 112 so as to drive the focus lens in the optical axis direction.

The image stabilization control microcomputer 115 drives the image stabilization actuator 116 (that is, the correction lens L1) based on the output signal from the shake sensor 117.

When the zoom operating ring is operated, the magnification varying lens is driven in the optical axis direction by a zoom drive mechanism, not shown. The zoom position detector outputs a digital signal (zoom position signal) corresponding to a divided area of the zoom range between the wide-angle end and the telephoto end, which is divided into a predetermined number of areas. The focus position detector outputs a digital signal (focus position signal) corresponding to a divided area of the focus range between the closest position and the infinite position, which is divided into a predetermined numbers of areas.

These zoom position signal and focus position signal are used in order to obtain focal length information and focus position information necessary to accurately perform calculation for AF in a TTL passive method which is the most commonly used single-lens reflex automatic focus (AF) method. The lens control microcomputer 112 reads data necessary for the calculation for AF out of table data stored on an ROM in the lens control microcomputer 112 based on the focal length information and focus position information. The data are transmitted to the camera 101, and the camera control microcomputer 102 having read the data performs a predetermined calculation for AF. The camera control microcomputer 102 transmits a focus drive command obtained as a result of the calculation for AF to the lens 111. The lens control microcomputer 112 drives the focus lens according to the focus drive command.

Figure 2:
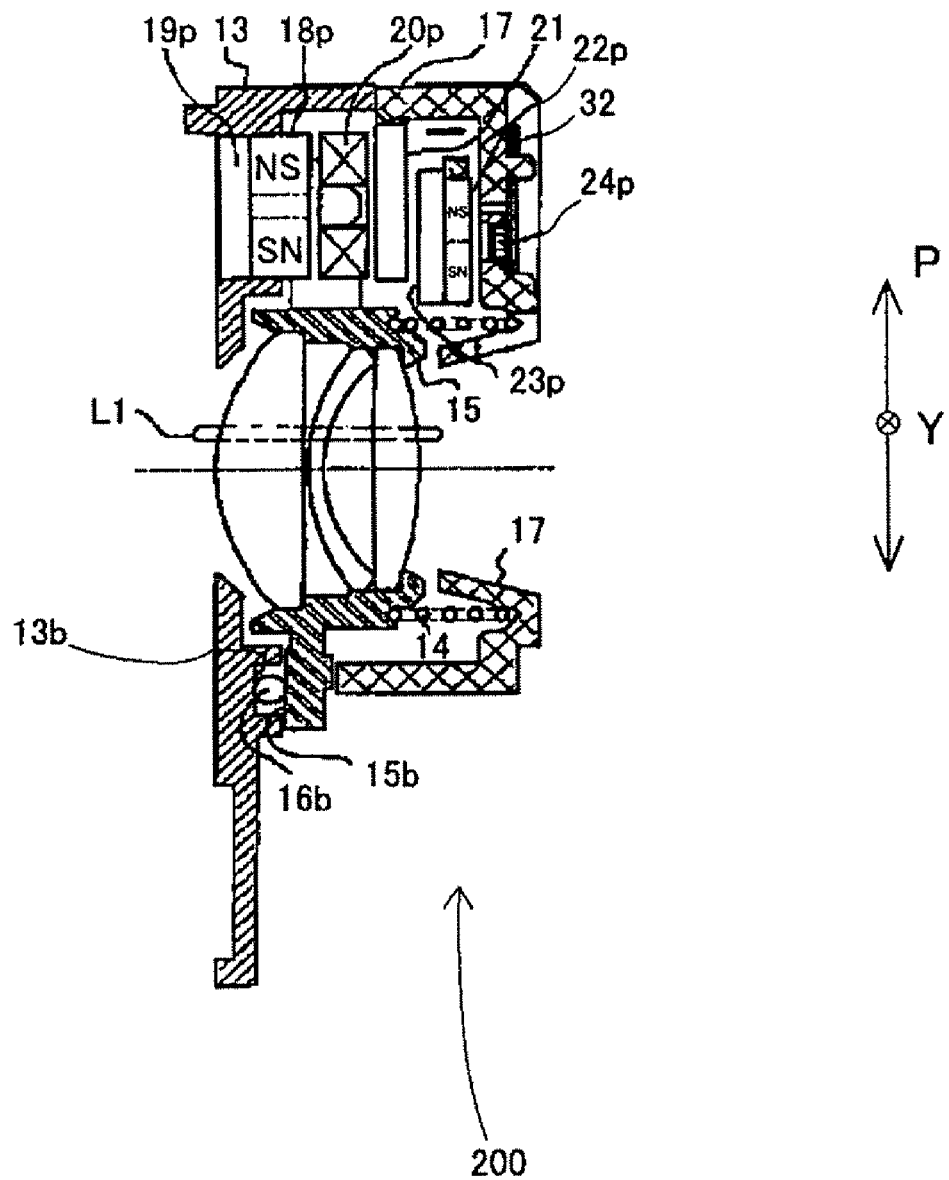
FIG. 2 is a sectional view of an image-stabilizing unit mounted on an interchangeable lens constituting the image-pickup system of the first embodiment.
Figure 3:
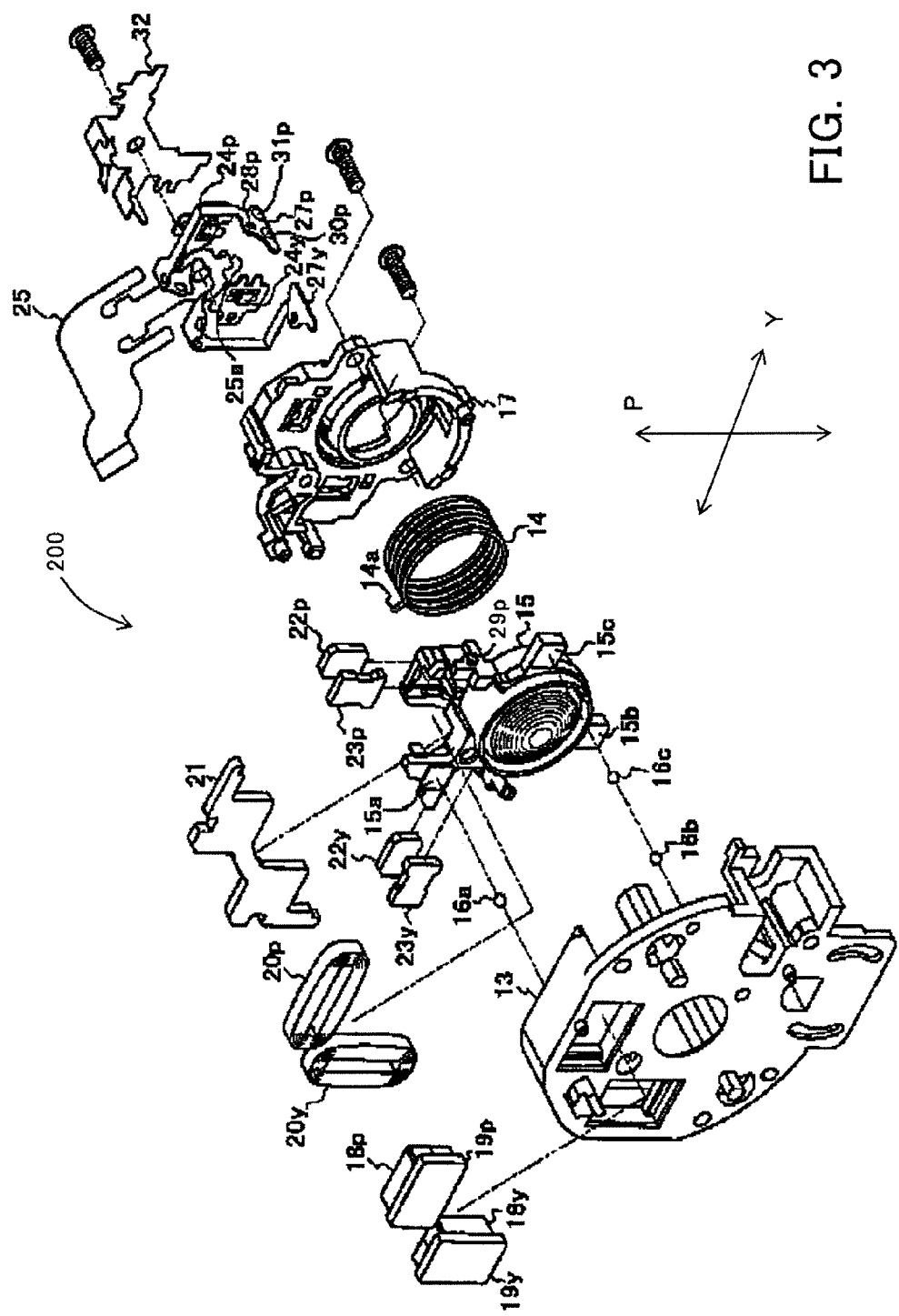
FIG. 3 is an exploded perspective view of the image-stabilizing unit of the first embodiment.
Figure 4:
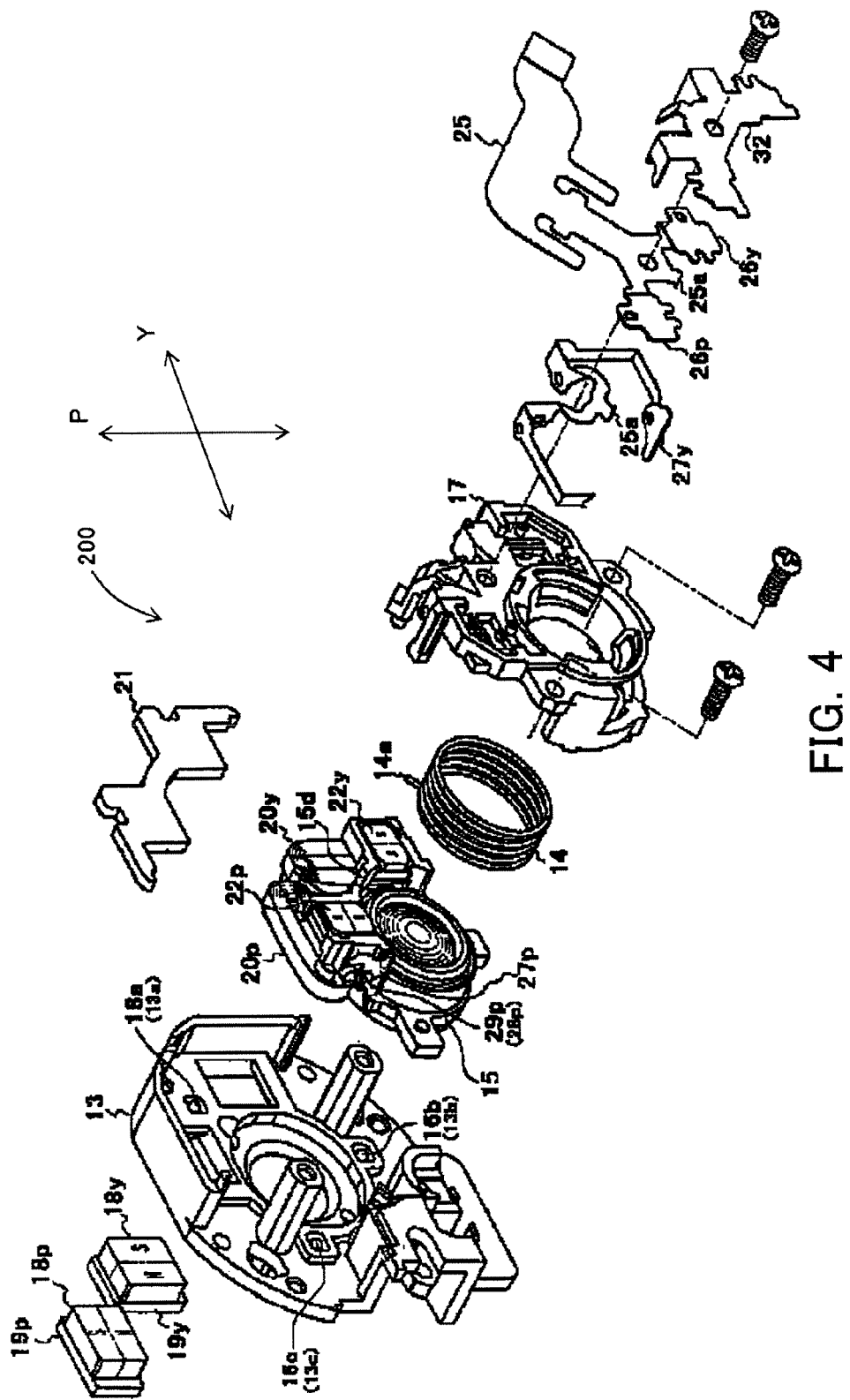
FIG. 4 is an exploded perspective view of the image-stabilizing unit of the first embodiment.

Next, the concrete configuration of the image-stabilizing unit 200 of this embodiment will be described by using FIGS. 2 to 4. FIG. 2 is a sectional view of the image-stabilizing unit 200. FIGS. 3 and 4 are exploded perspective views of the image-stabilizing unit 200 when viewed from a front side and a rear side, respectively.

The image-stabilizing unit 200 of this embodiment does not include a lock mechanism for keeping the movable unit at a center position when not using the image-stabilizing unit 200 (when the image stabilization switch 125 in FIG. 1 is off). The center position of the movable unit used here is the position at which an optical axis center of the correction lens L1 coincides with or can be optically regarded as coinciding with the optical axis of the lens unit 120 as a portion other than the correction lens L1 of the image-pickup optical system.

The image-stabilizing unit 200 includes a pitch direction image stabilization actuator for driving the movable unit (correction lens L1) in a pitch direction P and a yaw direction image stabilization actuator for driving it in a yaw direction Y. The image-stabilizing unit 200 also includes a pitch-direction position detecting system for detecting the position of the movable unit in the pitch direction P and a yaw-direction position detecting system for detecting the position in the yaw direction Y. Both the image stabilization actuators and both the position detecting systems have the same configurations, respectively, while only their placements are different by 90 degrees around the optical axis. For this reason, the image stabilization actuators and the position detecting systems will hereinafter be described only relating to the pitch direction P.

In the drawings, the components indicated by the symbols with a subscript p relate to the pitch direction while the components indicated by the symbols with a subscript y relate to the yaw direction.

Reference numeral 13 denotes a base member which is a fixed member on the front side of the image-stabilizing unit 200, and it is fixed on the body of the lens 111. Reference numeral 14 denotes a compression coil spring which is formed by a material not attracted by magnets for position detection and driving placed in proximity thereto, described later, such as a phosphor bronze line. An end 14a of the compression coil spring 14 is bent outward in a radial direction of the compression coil spring 14.

Reference numeral 15 denotes a shift lens-barrel for holding the correction lens L1. An end of the compression coil spring 14 on the front side in the optical axis direction is engaged with the shift lens-barrel 15 so as to be approximately coaxial with the optical axis of the correction lens L1. The end 14a of the compression coil spring 14 is engaged with a V-groove portion 15d formed on the shift lens-barrel 15.

Reference numerals 16a, 16b and 16c denote three balls sandwiched between the base member 13 and the shift lens-barrel 15. Each ball is formed by the material not attracted by the magnet for driving placed in proximity thereto, such as SUS 304 (austenite stainless steel). The surfaces in contact with the balls 16a, 16b and 16c are surfaces 13a, 13b and 13c on the base member 13, respectively, and are surfaces 15a, 15b and 15c on the shift lens-barrel 15, respectively. Each of the contact surfaces is a plane orthogonal to the optical axis of the image-pickup optical system.

In the case where outside diameters of the three balls 16a, 16b and 16c are the same, it is possible to reduce the difference among the distances between the contact surfaces opposite to each other in the optical axis direction at three locations. This makes it possible to guide the movement of the correction lens L1 while maintaining its position which is orthogonal to the optical axis.

Reference numeral 17 denotes a sensor base as a fixed member on the rear side, which is positioned by two positioning pins and coupled to the base member 13 by two screws. A rear end of the compression coil spring 14 is engaged with the sensor base 17, and is fixed on the sensor base 17 by adhesion or the like. The compression coil spring 14 is compressed between the shift lens-barrel 15 and the sensor base 17. Thus, the contact surfaces of the shift lens-barrel 15 and the base member 13 are brought into contact with the three balls 16a, 16b and 16c with pressure.

A lubricant is placed between the three balls 16a, 16b and 16c and the contact surfaces. The lubricant has a sufficient degree of viscosity to prevent the balls from easily dropping off the contact surfaces even in a state where the balls are not sandwiched between the base member 13 and the shift lens-barrel 15. Thus, an inertia force exceeding the biasing force of the compression coil spring 14 acts on the shift lens-barrel 15, which prevents the ball positions from easily deviating even if the balls are put in a non-sandwiched state.

Next, the configuration of the pitch direction image stabilization actuator will be described. Reference numeral 18p denotes a driving magnet which is two-pole-magnetized in a radiating direction from the optical axis. Reference numeral 19p denotes a yoke for closing a magnetic flux on the front side in the optical axis direction of the driving magnet 18p. Reference numeral 20p denotes a coil fixed on the shift lens-barrel 15 by adhesion.

Reference numeral 21 denotes a yoke for closing a magnetic flux on the rear side in the optical axis direction of the driving magnet 18p. The yoke 21 is fixed on the base member 13 with magnetism so as to form space with the driving magnet 18p for allowing a coil 20p to move. Thus, a closed magnetic circuit is formed.

When the coil 20p is energized, a Lorentz force is generated in the direction approximately orthogonal to the magnetization boundary of the driving magnet 18p due to mutual repulsion of magnetic field lines generated between the driving magnet 18p and the coil 20p, thereby moving the shift lens-barrel 15. This configuration is referred to as a so-called moving coil type.

The image-stabilizing unit 200 has the yaw direction image stabilization actuator of the same configuration as the pitch direction image stabilization actuator placed therein. It is thereby possible to drive the movable unit composed of the correction lens L1 and the shift lens-barrel 15 in the pitch direction and the yaw direction which are orthogonal to the optical axis and mutually orthogonal.

Here, a description will be made of the relationship between the base member 13 and the movable unit (shift lens-barrel 15) with respect to the ball 16b by using FIGS. 5A to 5D. The same relationship is applied to the other balls 16a and 16c.

In FIG. 5A, the shift lens-barrel 15 is at a movable center position thereof (the position at which the optical axis of the correction lens L1 coincides or substantially coincides with the optical axis of the lens unit 120). The ball 16b is also located at the center of the ball movement range limited by a frame 13d formed around the contact surface 13b of the base member 13. The frame 13d is a limiting portion to prevent the ball 16b from moving beyond the ball movement range.

FIG. 5B shows the state in which the shift lens-barrel 15 is driven in a down-pointing arrow direction from this state. The shift lens-barrel 15 is driven to a mechanical end, not shown, provided on the base member 13, and is moved by 'a' from the movable center position.

As the ball 16b is sandwiched by the base member 13 and the shift lens-barrel 15, it rolls from the position of FIG. 5A in the arrow direction and moves to a position shown in FIG. 5B. Rolling friction of the ball 16b is small enough as compared with sliding friction, so that there is no slip between the ball 16b and the contact surfaces 13b, 15b. For this reason, the shift lens-barrel 15 moves with respect to the base member 13 while guided by rolling of the ball 16b. In this case, the shift lens-barrel 15 and the base member 13 move in relatively opposite directions to the center of the ball 16b. Therefore, the movement amount of the ball 16b to the base member 13 is a half the movement amount of the shift lens-barrel 15. To be more specific, the movement amount 'b' of the ball 16b is a half of 'a', that is, (a÷2) as shown in FIG. 5B.

FIG. 5C shows the base member 13 and the ball 16b when viewing the state of FIG. 5A from the rear side in the optical axis direction. The ball 16b is located at the center of the movement range in the pitch direction and yaw direction. The frame 13d is shown around the ball 16b and the contact surface 13b. The distance between internal surfaces of the frame 13d, that is, a size of the ball movement range in the pitch direction and yaw direction is represented by (r+b+c) from the center when the radius of the ball 16b is 'r'. Reference character c denotes a mechanical margin amount.

In the case where the ball 16b is at a position deviating from the center of the ball movement range shown in FIG. 5C by 'c' or more, when the shift lens-barrel 15 is driven as shown in FIG. 5B, the ball 16b contacts the internal surfaces of the frame 13d before the shift lens-barrel 15 moves by 'a' and contacts the mechanical end. After the ball 16b contacts the internal surfaces of the frame 13d, the shift lens-barrel 15 is driven to the mechanical end while sliding against the ball 16b. When the shift lens-barrel 15 is returned to the movable center position from this state, the ball 16b returns by rolling to the position at the distance of 'c' from the center of the ball movement range.

Thus, when the shift lens-barrel 15 is returned to the movable center position after being driven to the mechanical end, the center of the ball 16b is located within a rectangular area having sides of distances 'c' from the center of the ball movement range whatever position the ball 16b is initially at as shown in FIG. 5D. To be more specific, the ball 16b returns to an initial position (reset position) in the vicinity of the center of the ball movement range.

This series of operations are referred to as a reset operation (initializing operation or specific operation) of the balls in this embodiment. The initializing operation is performed as a different operation from an image stabilization operation of the image-stabilizing unit 200 based on the output of the shake sensor 117.

If the shift lens-barrel 15 is moved by the same distance in the pitch direction and the yaw direction, the shift lens-barrel 15 moves to the position of √2 times a drive amount of each direction in the direction at 45 degrees to the pitch direction and the yaw direction. For this reason, the shift lens-barrel 15 is not driven completely independently in the pitch direction and the yaw direction in an actual usage state, but is driven in reflection of the position in the other direction in a barrel movement range of a circular shape or an almost circular polygonal shape which is centered on the optical axis. The three balls 16a, 16b and 16c perform rolling motion in a range having a shape similar to the shape of the barrel movement range and a half size thereof.

The ball movement range has a rectangular shape with the two sides parallel to the pitch direction and the two sides parallel to the yaw direction. If the ball movement range has the circular shape or the polygonal shape according to the movable range of the balls in the above-mentioned actual usage state, there are the cases where the balls do not move to the positions for contacting the frame 13d and so a correct reset operation cannot be performed, which is not desirable.

In this embodiment, the ball movement range has a rectangular shape two sides parallel to the pitch direction and the two sides parallel to the yaw direction. The ball movement range is set such that, when the ball is biased to two adjacent sides (corners) in the ball movement range (frame 13d), a gap between the ball and the other two sides becomes a little larger than a half of the mechanical maximum movement amount or the maximum movement amount in actual use of the shift lens-barrel 15 in the direction toward the other two sides. If a ball reset operation is performed under such a setting, the ball does not contact the frame 13d in actual use so that the shift lens-barrel 15 can be guided just by rolling of the ball.

As previously described, it is possible, by placing the lubricant between the balls and the contact surfaces, to reduce the sliding friction between the balls and the contact surfaces so as to lessen influence over position control of the movable unit.

This embodiment described the case of providing the frame 13d for limiting the ball movement range on the base member 13. However, it may also be provided on the shift lens-barrel 15. This embodiment also described the case of using the three balls. However, the number of the balls is not limited to this according to the present invention.

In FIGS. 2 to 4, reference numerals 22p and 22y denote detecting magnets which are two-pole-magnetized in a radiating direction from the optical axis. Reference numerals 23p and 23y denote yokes for closing magnetic fluxes placed on the front side of the detecting magnets 22p and 22y. The detecting magnets 22p, 22y and the yokes 23p, 23y are fixed on the shift lens-barrel 15.

Reference numeral 24p denotes a hall element for converting a change in magnetic flux density to an electrical signal, which is positioned and fixed on the sensor base 17.

Reference numeral 25 denotes a flexible substrate for electrically connecting the coil 20p and hall element 24p constituting the pitch-direction position detecting system to an external circuit. The flexible substrate 25 is folded back at the portion of reference numeral 25a. The hall element 24p is mounted on the front side in the optical axis direction of the portion of reference numeral 26p.

The folded-back portion further has three bending portions, where a pin 29p formed on the shift lens-barrel 15 is inserted into an opening 28p formed at a tip 27p of the bending portion. The tip 27p is rotatable around the pin 29p. Furthermore, terminals of the coil 20p are soldered on land portions 30p, 31p provided on the tip 27p. The yaw-direction position detecting system is composed of a coil 20y and a hall element 24y fixed on the sensor base 17 which are also electrically connected to the external circuit by the flexible substrate 25.

Reference numeral 32 denotes a retainer plate for fixing the flexible substrate 25 on the sensor base 17, which is fixed on the sensor base 17 with one screw.

In the image-pickup system configured as above, one of the timings when the photographer is not observing the subject through the finder optical system 106 is when the lens 111 is mounted on the camera 101.

Figure 6:
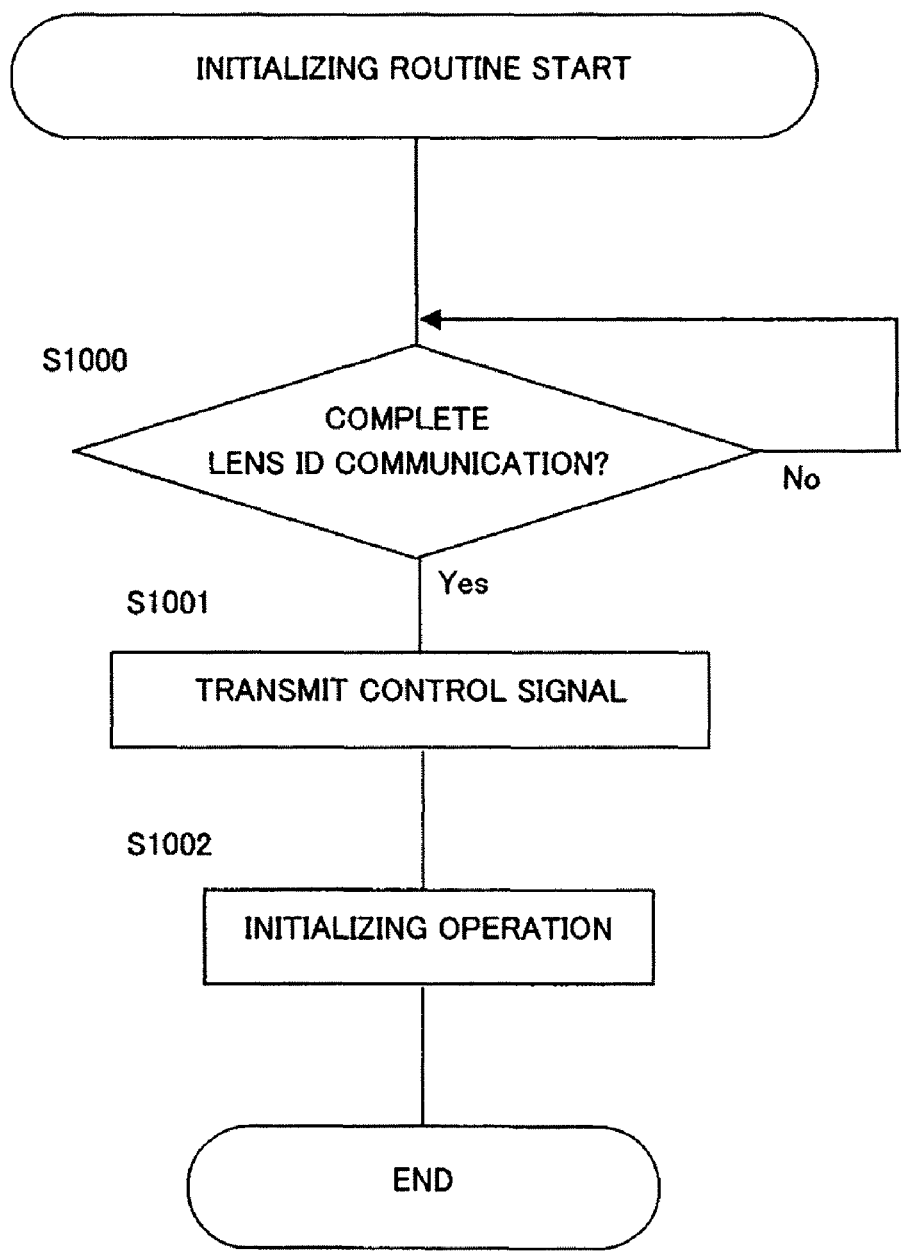
FIG. 6 is a flowchart showing an operation sequence of the image-pickup system of the first embodiment.

FIG. 6 shows a flowchart of an initializing operation sequence of the lens 111 (the lens control microcomputer 112 and image stabilization control microcomputer 115) in this embodiment. The operation is performed according to a computer program stored in each of the microcomputers. This also applies to the other embodiments described later.

The lens 111 may be mounted on the camera 101 irrespective of whether a main switch (power switch) 122 of the camera 101 is on (power-on) or off (power-off). For this reason, the following operation is performed irrespective of whether the power of the camera 101 is on or off in this embodiment.

In step (described as 'S' in the drawing) 1000, the lens control microcomputer 112 determines whether or not communication of a lens ID has been performed to the camera control microcomputer 102. The lens ID is necessary information for the sake of identifying a model of the mounted lens and performing lens control (focus control and stop control) corresponding to the model. The communication of the lens ID is initial communication which is initially performed between the lens 111 and the camera 101 after the lens 111 is mounted on the camera 101. For this reason, the lens control microcomputer 112 can recognize that the lens 111 is normally mounted on the camera 101 by determining that the communication of the lens ID has been performed.

If determined that the communication of the lens ID has been performed, the process proceeds to step 1001. If determined that no communication of the lens ID has been performed, the process repeats 51000.

In step 1001, the lens control microcomputer 112 transmits a control signal for having the image stabilization control microcomputer 115 perform the initializing operation of the image-stabilizing unit 200 irrespective of the state of the image stabilization switch 125.

In step 1002, the image stabilization control microcomputer 115 transmits a driving signal to the image stabilization actuator 116 to have the image-stabilizing unit 200 perform the image stabilization initializing operation.

After the initializing operation is thus performed, the image stabilization operation of the image-stabilizing unit 200 is started if the image stabilization switch 125 is turned on and the first stroke switch (SW1) 129a is turned on on the camera 101.

As described above, according to this embodiment, the initializing operation of the image-stabilizing unit 200 (ball positions) is performed in response to the mounting of the lens 111 on the camera 101, so that it is possible to prevent displacement of the subject image due to the initializing operation from being seen by the photographer through the finder optical system 106.

[Second Embodiment]

Figure 7:
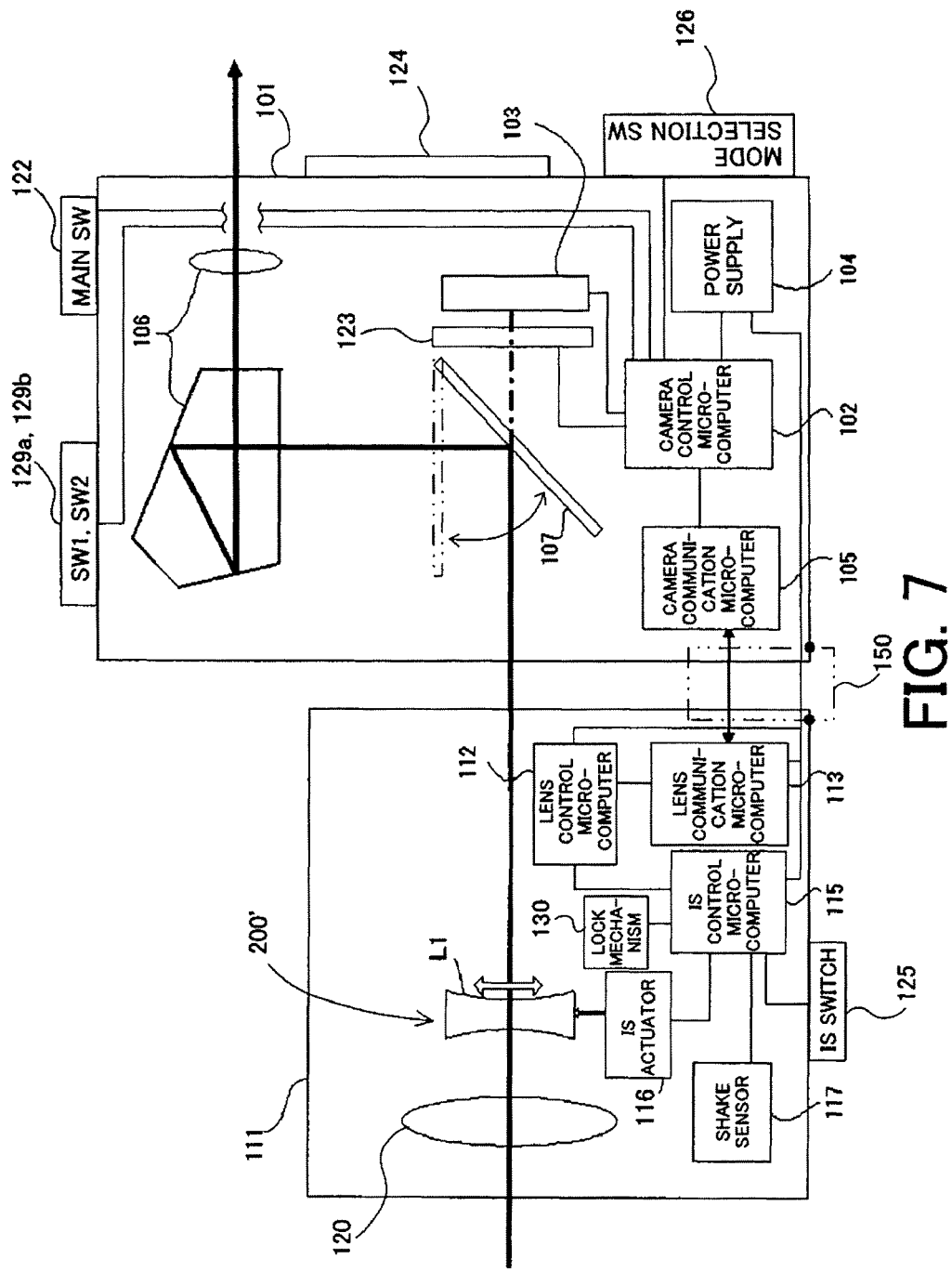
FIG. 7 is a block diagram showing the configuration of the single-lens reflex image-pickup system, which is the second embodiment of the present invention.

FIG. 7 shows the configuration of the interchangeable lens constituting the single-lens reflex image-pickup system which is the second embodiment of the present invention. The basic configuration of the image-pickup system of this embodiment is the same as that of the image-pickup system of the first embodiment. For this reason, the components in common are given the same reference symbols as in the first embodiment.

However, an image-stabilizing unit 200' of this embodiment includes a lock mechanism 130 for holding the movable unit at the center position when the image-stabilizing unit 200' is not in use (in the case where the image stabilization switch 125 is off). The lock mechanism 130 performs a lock operation for locking the movable unit and an unlock operation for unlocking it by means of a lock actuator which is not shown.

Figure 8:
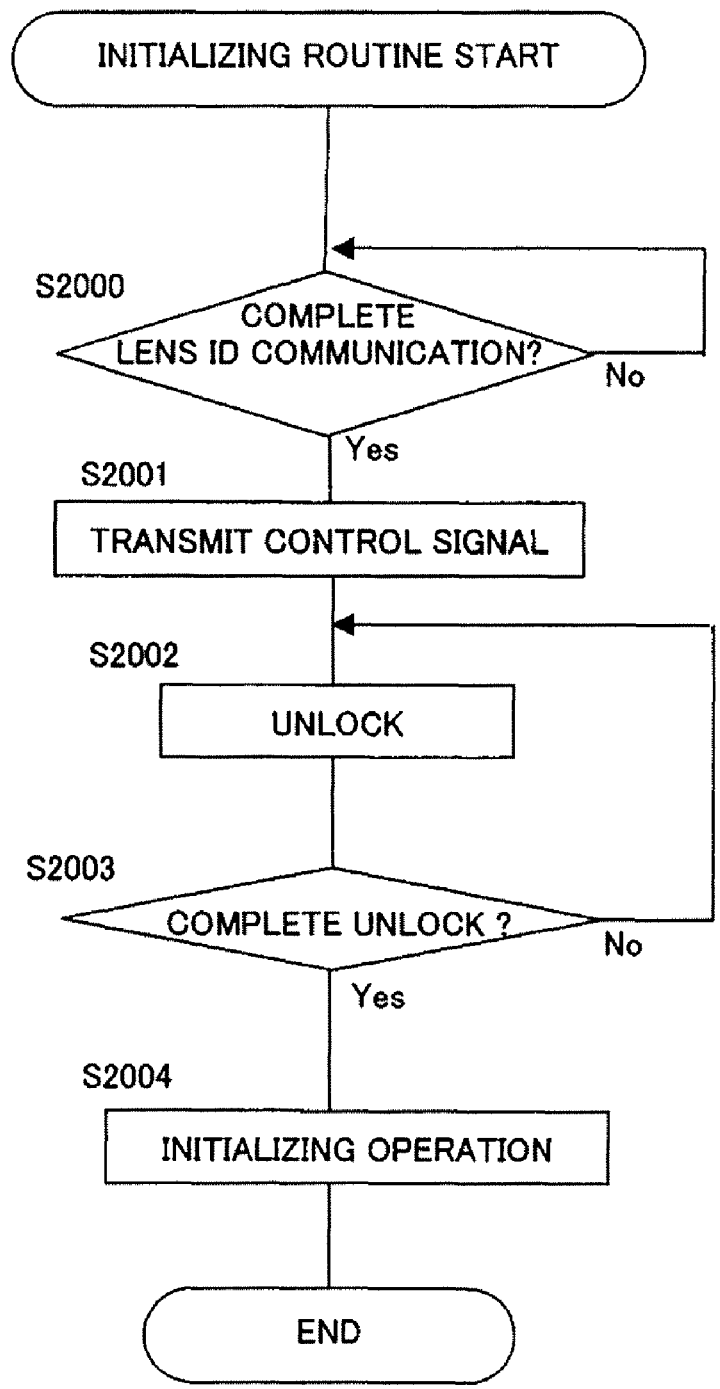
FIG. 8 is a flowchart showing the operation sequence of the image-pickup system of the second embodiment.

FIG. 8 shows a flowchart of the initializing operation sequence of the lens 111 (the lens control microcomputer 112 and the image stabilization control microcomputer 115) of this embodiment.

In step 2000, the lens control microcomputer 112 determines whether or not communication of a lens ID has been performed to the camera control microcomputer 102 as in the first embodiment (step 1000 of FIG. 6). If determined that the communication of the lens ID has been performed, the process proceeds to step 2001. If determined that no communication of the lens ID has been performed, the process repeats step 2000.

In step 2001, the lens control microcomputer 112 transmits a control signal for performing the initializing operation of the image-stabilizing unit 200' to the image stabilization control microcomputer 115 irrespective of the state of the image stabilization switch 125.

In step 2002, the image stabilization control microcomputer 115 transmits a driving signal to the lock actuator to have an unlocking operation of the lock mechanism 130 performed.

Next, in step 2003, it is determined whether or not the unlocking operation of the lock mechanism 130 has been completed. Completion of the unlocking operation is determined by, for example, detecting whether or not a member constituting the lock mechanism 130 have moved to an unlock position by means of a photo interrupter. If the unlocking operation is completed, the process proceeds to step 2004. If not completed, the process returns to step 2002.

In step 2004, the image stabilization control microcomputer 115 transmits a driving signal to the image stabilization actuator 116 to have the image-stabilizing unit 200' perform the initializing operation. The initializing operation is the same as that described in the first embodiment.

After the initializing operation is thus performed, the image stabilization operation of the image-stabilizing unit 200 is started if the image stabilization switch 125 is turned on and the first stroke switch (SW1) 129a is turned on on the camera 101.

As described above, according to this embodiment, the unlocking and initializing operations of the image-stabilizing unit 200' are performed in response to the mounting of the lens 111 on the camera 101, so that it is possible to prevent displacement of the subject image due to the initializing operation from being seen by the photographer through the finder optical system 106.

The first and second embodiments described the cases where the initializing operation of the image-stabilizing unit is performed in response to the initial communication performed immediately after mounting the lens on the camera. However, a trigger of the initializing operation of the present invention is not limited thereto. For instance, the initializing operation of the image-stabilizing unit may be performed in response to a detection signal form a switch for detecting the mounting of the lens on the camera, which is provided on the lens or the camera.

[Third Embodiment]

Figure 9:
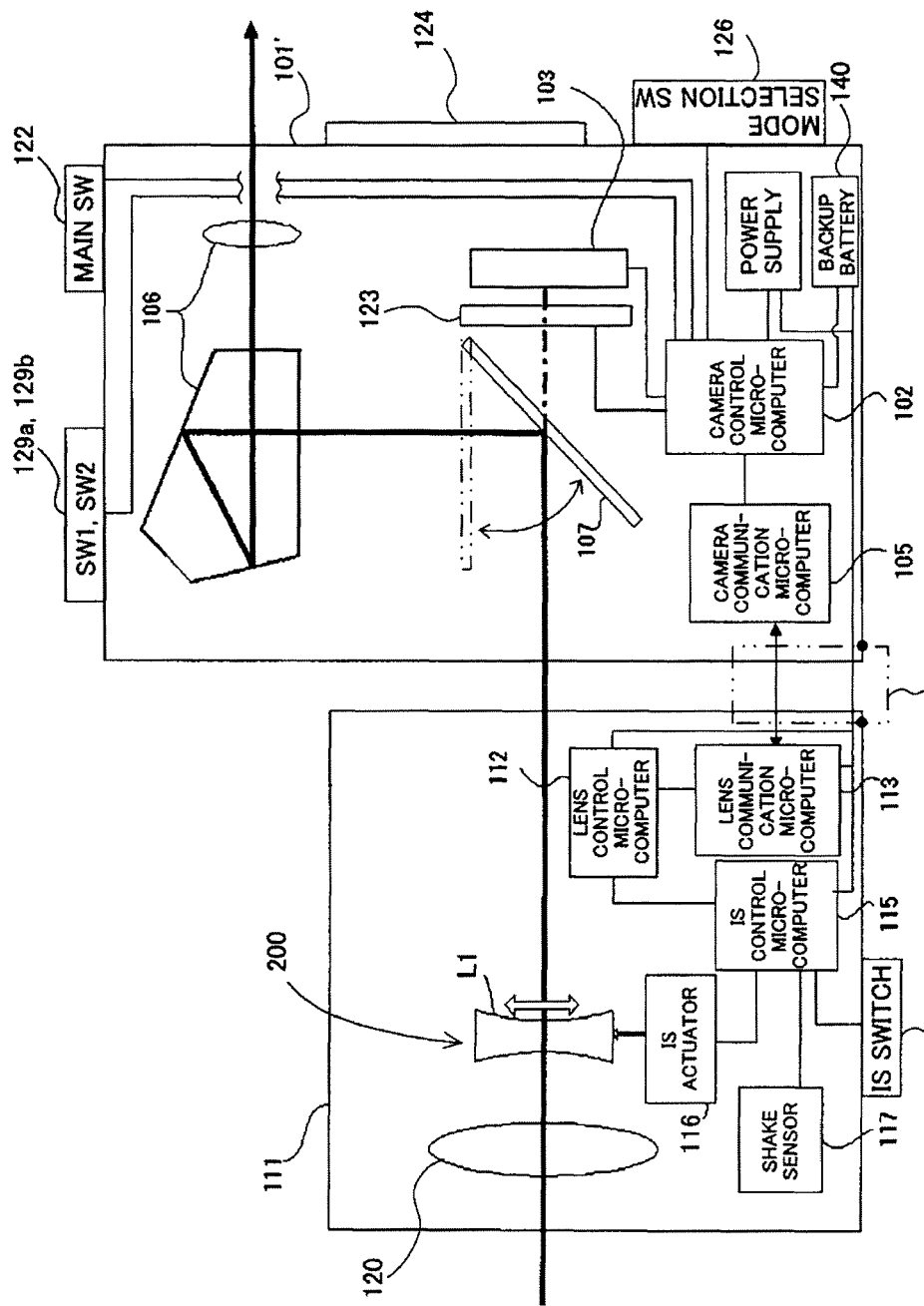
FIG. 9 is a block diagram showing the configuration of the single-lens reflex image-pickup system, which is the third embodiment of the present invention.

FIG. 9 shows the configuration of the single-lens reflex image-pickup system which is the third embodiment of the present invention. The basic configuration of the image-pickup system of this embodiment is the same as that of the image-pickup system of the first embodiment. For this reason, the components in common are given the same reference symbols as in the first embodiment.

However, a camera 101' of this embodiment is loaded with a backup battery 140. The backup battery 140 supplies the electric power for operating the camera control, lens control and image stabilization control microcomputers 102, 112 and 115 when the main switch 122 which is the power switch of the camera 101' is in an off (power-off) state.

In this embodiment, the initializing operation of the image-stabilizing unit 200 is performed when a certain time elapses after the main switch 122 is switched from on to off.

To be more precise, when the camera control microcomputer 102 determines that the main switch 122 is off and a certain time period has elapsed after switching to off, it performs communication to notify the lens control microcomputer 112 thereof. The lens control microcomputer 112 having received the communication causes the initializing operation of the image-stabilizing unit 200 to be performed via the image stabilization control microcomputer 115. The initializing operation of the image-stabilizing unit 200 is the same as the description in the first embodiment.

Figure 10:
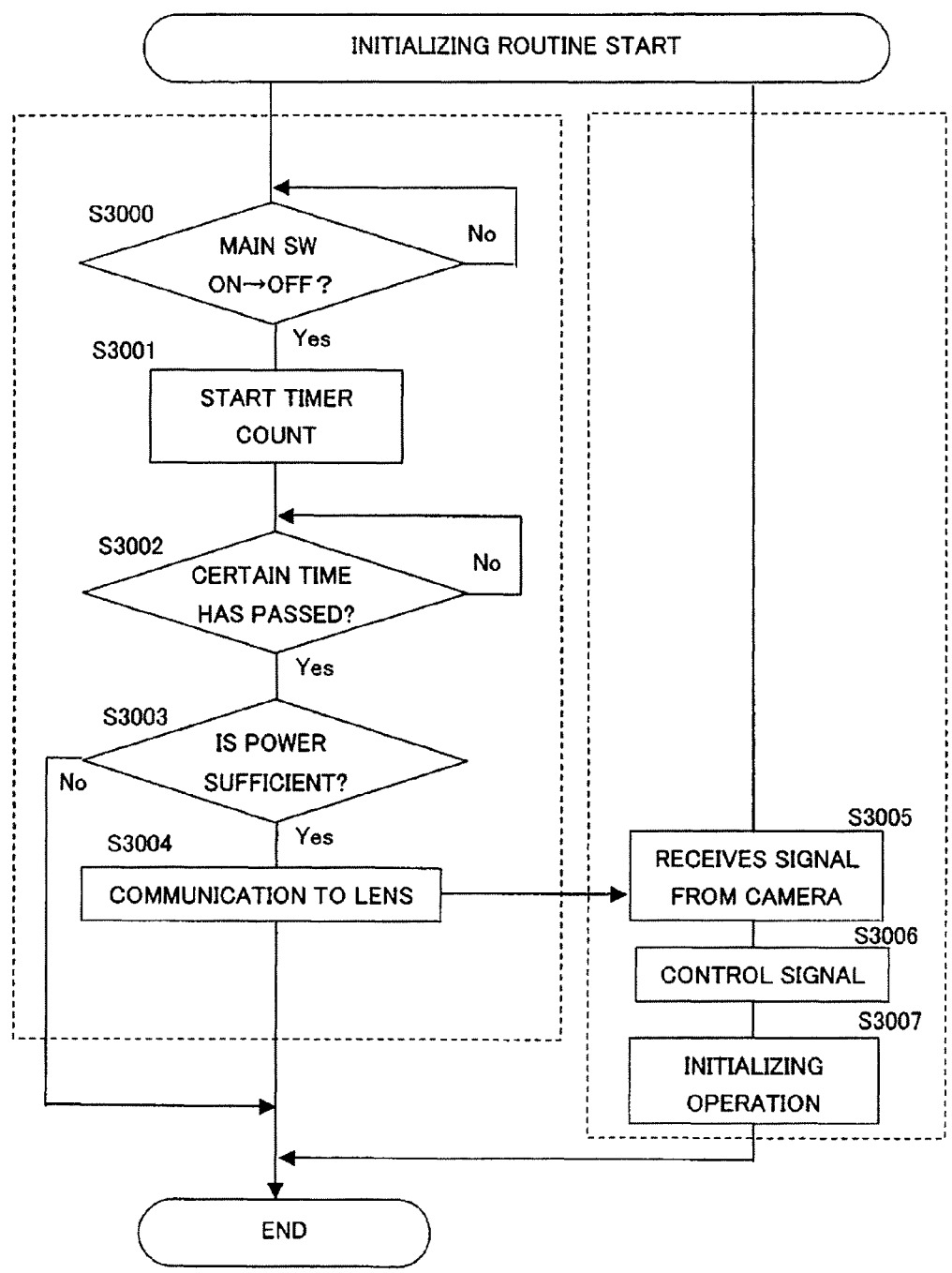
FIG. 10 is a flowchart showing the operation sequence of the image-pickup system of the third embodiment.

Next, the operation sequence of the above-mentioned camera 101' and the lens 111 will be described by using the flowchart of FIG. 10. The flow enclosed by a dotted frame on the left side of FIG. 10 shows the operation sequence of the camera 101' (camera control microcomputer 102). The flow enclosed by the dotted frame on the right side shows the operation sequence of the lens 111 (lens control microcomputer 112 and image stabilization control microcomputer 115).

In step 3000, the camera control microcomputer 102 determines whether or not the main switch 122 is switched from on to off. If switched from on to off, the process proceeds to step 3001. If not switched (in the case of on), the process returns to step 3000.

In step 3001, the camera control microcomputer 102 starts a timer count by using its internal clock counter (not shown).

Next, in step 3002, the camera control microcomputer 102 determines whether or not the timer count of the certain time period has been completed (the certain time period has elapsed). If completed, the process proceeds to step 3003. If not completed, the process repeats step 3002.

In step 3003, the camera control microcomputer 102 determines whether or not the backup battery 140 or the power supply 104 has sufficient electric power to have the image-stabilizing unit 200 perform the initializing operation. In the case of having the sufficient electric power, the process proceeds to step 3004. In the case of not having the sufficient electric power, this flow is finished.

In step 3004, the camera control microcomputer 102 transmits to the lens control microcomputer 112 a signal indicating that the certain time elapsed after switch-off of the main switch 122. The signal transmitted in this case may be a command signal for directing the initializing operation of the image-stabilizing unit 200.

In step 3005, the lens control microcomputer 112 receives the signal from the camera control microcomputer 102.

In step 3006, the lens control microcomputer 112 transmits a control signal for having the image stabilization control microcomputer 115 perform the initializing operation of the image-stabilizing unit 200 irrespective of the state of the image stabilization switch 125.

In step 3007, the image stabilization control microcomputer 115 transmits a driving signal to the image stabilization actuator 116 to have the image-stabilizing unit 200 perform the initializing operation.

As described above, according to this embodiment, the initializing operation of the image-stabilizing unit 200 is performed in the state where the main switch 122 of the camera 101 is off, that is, in the state where the photographer normally does not perform the finder observation of the subject. Therefore, it is possible to prevent displacement of the subject image due to the initializing operation from being seen by the photographer.

[Fourth Embodiment]

Figure 11:
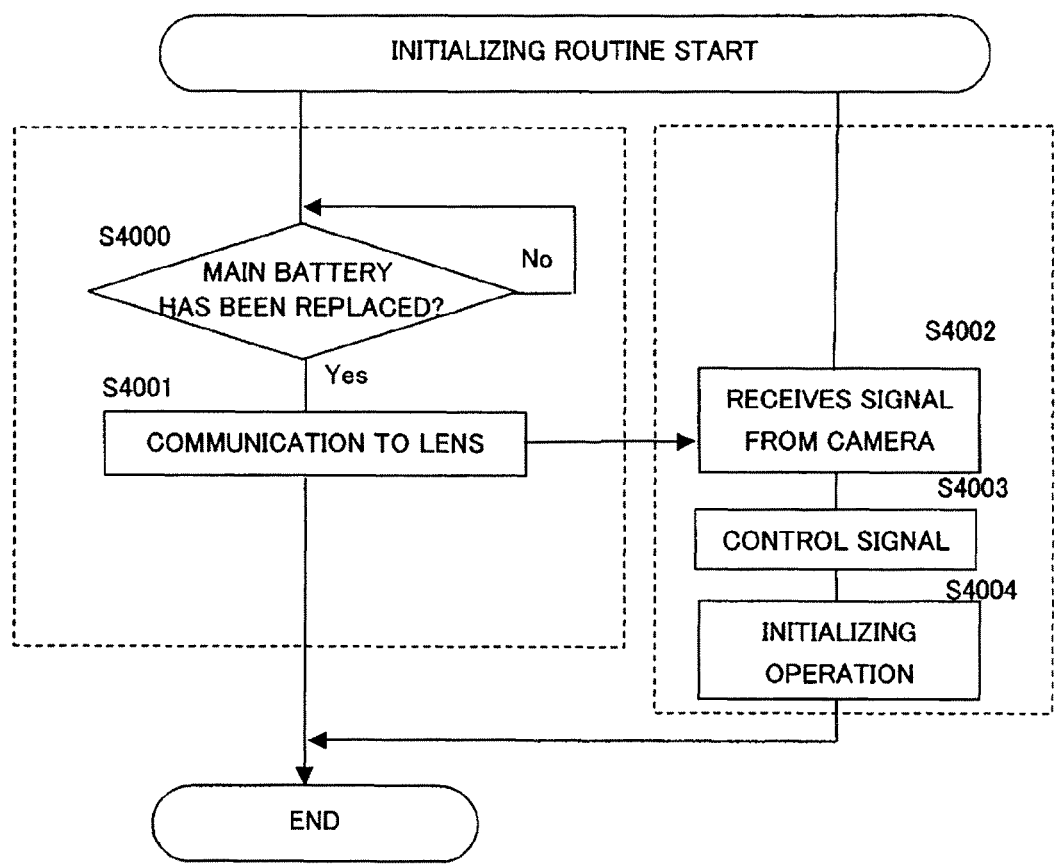
FIG. 11 is a flowchart showing the operation sequence of the single-lens reflex image-pickup system, which is the fourth embodiment of the present invention.

The flowchart of FIG. 11 shows the initializing operation sequence of the image-stabilizing unit of the single-lens reflex image-pickup system which is the fourth embodiment of the present invention. The basic configuration of the image-pickup system of this embodiment is the same as that of the image-pickup system of the first embodiment. For this reason, the components in common are given the same reference symbols as in the first embodiment.

In step 4000, the camera control microcomputer 102 determines whether or not the power supply (main battery) 104 loaded on the camera 101 has been replaced. If replaced, the process proceeds to step 4001. If not replaced, the process returns to step 4000. It can be determined that the power supply 104 has been replaced from the fact that supply of the electric power to the camera control microcomputer 102 from the power supply 104 was stopped once and is then restarted. It may also be determined from the fact that a power loading switch, not shown, became off once (the power supply 104 was removed) and then became on again (the power supply 104 was loaded).

In step 4001, the camera control microcomputer 102 transmits a signal indicating that the power supply 104 has been replaced to the lens control microcomputer 112. The signal transmitted in this case may be the command signal for directing the initializing operation of the image-stabilizing unit 200.

In step 4002, the lens control microcomputer 112 receives the signal from the camera control microcomputer 102.

In step 4003, the lens control microcomputer 112 transmits a control signal for having the image stabilization control microcomputer 115 perform the initializing operation of the image-stabilizing unit 200 irrespective of the state of the image stabilization switch 125.

In step 4004, the image stabilization control microcomputer 115 transmits a driving signal to the image stabilization actuator 116 to have the image-stabilizing unit 200 perform the image stabilization initializing operation.

As described above, according to this embodiment, the initializing operation of the image-stabilizing unit 200 is performed when the power supply 104 of the camera 101 is replaced, that is, in the state where the photographer normally does not perform the finder observation of the subject. Therefore, it is possible to prevent displacement of the subject image due to the initializing operation from being seen by the photographer.

There are the cases where, if the power supply 104 is removed, the information on the lens held by the camera control microcomputer 102 till then is reset. If a new power supply 104 is loaded in this case, the camera control microcomputer 102 often requests the lens control microcomputer 112 to transmit the lens ID.

For this reason, as in the first embodiment, the camera control microcomputer 102 may determine the transmission of the lens ID and perform the initializing operation of the image-stabilizing unit 200.

[Fifth Embodiment]

The lens apparatus of the present invention may have an image-stabilizing unit other than the image-stabilizing unit having the configuration described in the first embodiment mounted thereon. An example thereof as the fifth embodiment of the present invention is shown in FIGS. 12 and 13.

Figure 12:
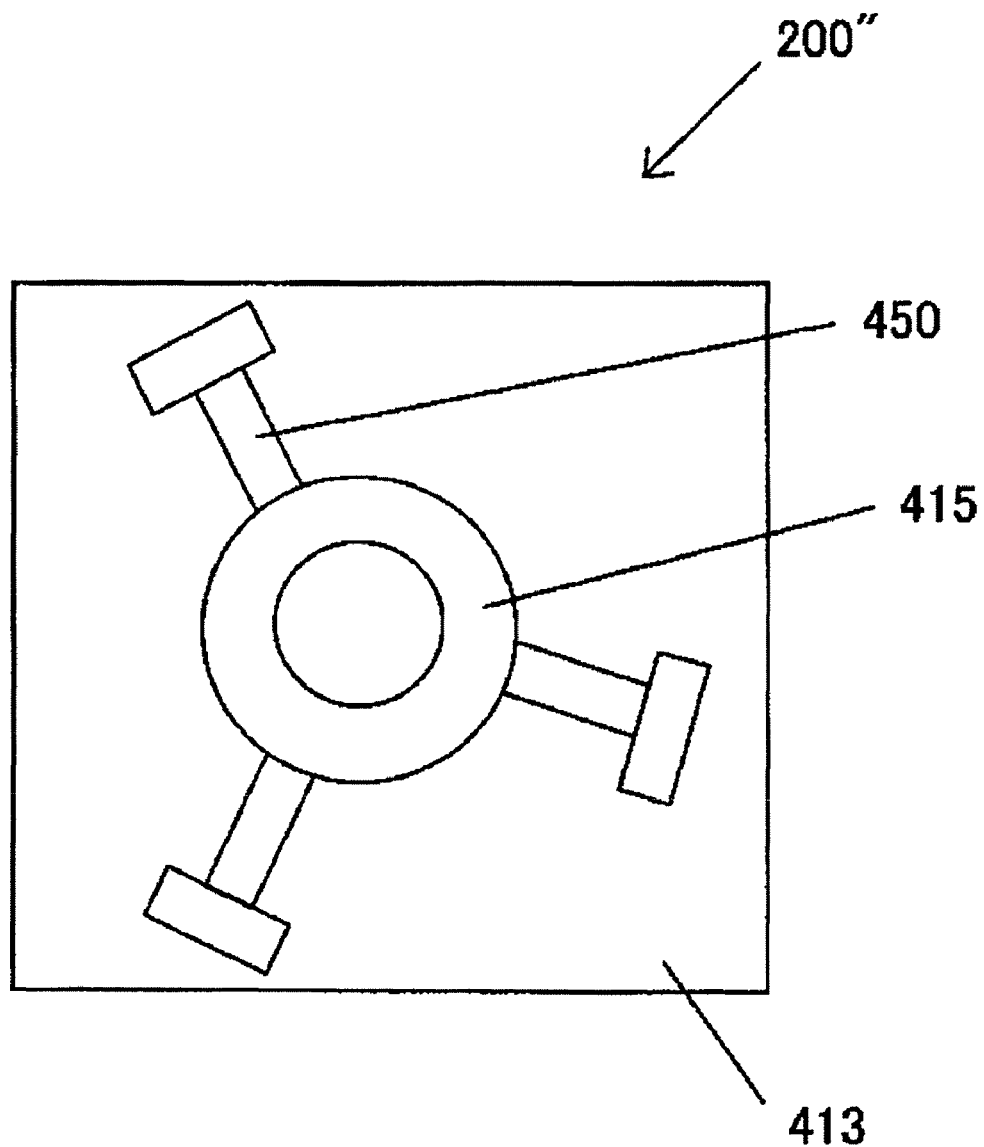
FIG. 12 is a front view showing a modified example of the image-stabilizing unit of the first embodiment.
Figure 13:
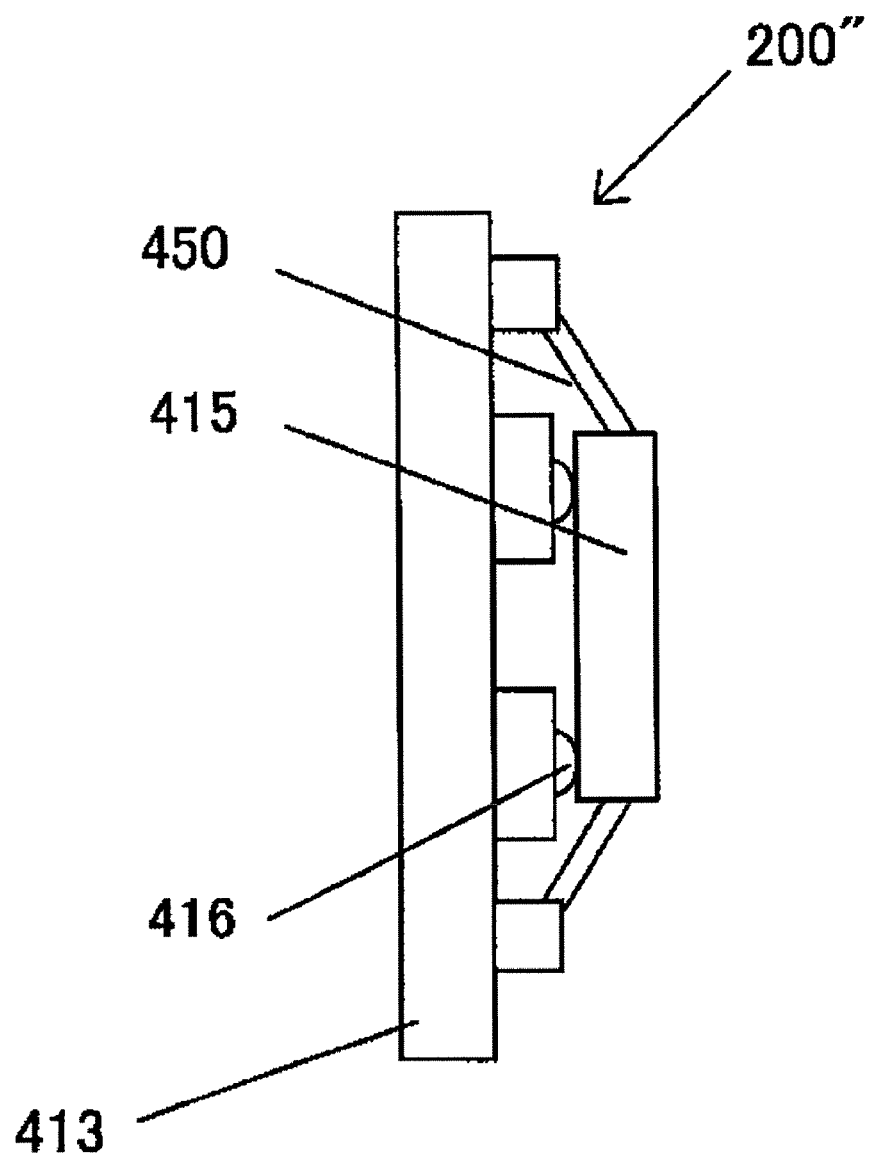
FIG. 13 is a side view showing the modified example of the image-stabilizing unit of the first embodiment.

In the image-stabilizing unit 200" shown in FIGS. 12 and 13, a shift lens-barrel 415 is biased on a shift base 413 side by three coil springs 450 placed between three locations on the periphery of the shift lens-barrel 415 and the shift base 413. It is thereby possible, as with the image-stabilizing unit 200 of the first embodiment, to bring a ball 416 into contact with the shift lens-barrel 415 and the shift base 413 with pressure.

Figure 14:
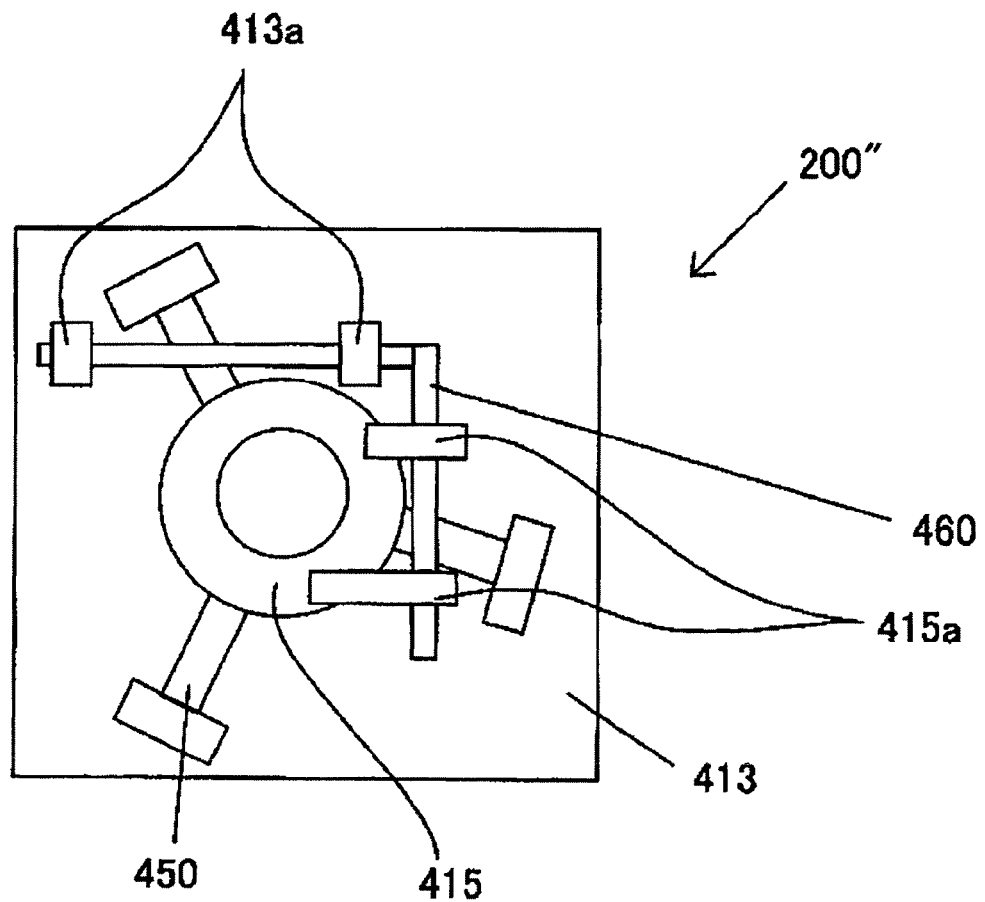
FIG. 14 is a front view showing another modified example of the image-stabilizing unit of the first embodiment.

To securely prevent the shift lens-barrel 415 from rotating around the optical axis, a guide shaft 460 for guiding the shift lens-barrel 415 in the pitch direction and yaw direction may be used as shown in FIG. 14.

The guide shaft 460 has an L-shape when viewed in an optical axis direction shown in FIG. 14. A yaw-direction shaft portion of the guide shaft 460 is engaged with catching parts 413a provided on the shift base 413 while allowing movement of the guide shaft 460 in the yaw-direction. A pitch-direction shaft portion of the guide shaft 460 is engaged with catching parts 415a provided on the shift lens-barrel 415 while allowing movement of the guide axis 460 in the pitch-direction.

As described above, according to the above-described embodiments, the initializing operation of the image-stabilizing unit (ball positions) is performed when mounting the optical apparatus on another optical apparatus, in a power-off state and when replacing the battery, that is, when the photographer is not observing the subject through the finder in general. Consequently, it is possible to prevent displacement of the subject image due to the initializing operation from being seen by the photographer.

The preferred embodiments of the present invention were described above. However, the present invention is not limited to these embodiments but various modifications and changes are possible.

The present invention is also applicable to a lens apparatus mounted on a camera (a video camera for instance) which has no quick return mirror and allows the subject image to be observed only by an electronic view finder.

Furthermore, the embodiments described the lens apparatus for performing the image stabilization by driving the correction lens. However the present invention is also applicable to an image-pickup apparatus (optical apparatus) including an image-stabilizing unit which performs the image stabilization by driving a movable unit including an image-pickup element for picking up a subject image. In this case, the image-pickup apparatus performs the initializing operation of the image-stabilizing unit when its own power switch is off or when the battery is replaced.

Furthermore, the present invention is not limited to these preferred embodiments and various variations and modifications may be made without departing from the scope of the present invention.

This application claims foreign priority benefits based on Japanese Patent Application No. 2005-356592, filed on Dec. 9, 2005, which is hereby incorporated by reference herein in its entirety as if fully set forth herein.

What is claimed is:

1. An optical apparatus comprising:
    an image-stabilizing unit which includes a movable unit movable for image stabilization and balls movable in conjunction with the movement of the movable unit; and
    a controller which controls operations of the movable unit,
    wherein the controller causes the movable unit to perform a reset operation for moving the balls to a movable center position, the reset operation being a different operation than an image stabilization operation of the image-stabilizing unit, and
    wherein the controller causes the movable unit to perform the reset operation in response to the controller determining that a certain time period has elapsed after a power switch has been turned off.

2. An image-pickup system comprising:
    an optical apparatus; and
    an image-pickup apparatus on which the optical apparatus is mounted,
    wherein the optical apparatus comprises:
    an image-stabilizing unit which includes a movable unit movable for image stabilization and balls movable in conjunction with the movement of the movable unit; and
    a controller which controls operations of the movable unit,
    wherein the controller causes the movable unit to perform a reset operation for moving the balls to a movable center position, the reset operation being a different operation than an image stabilization operation of the image-stabilizing unit, and
    wherein the controller causes the movable unit to perform the reset operation in response to the controller determining that a certain time period has elapsed after a power switch has been turned off.

* * * * *